(12) United States Patent
Keyser

(10) Patent No.: US 7,672,558 B2
(45) Date of Patent: Mar. 2, 2010

(54) SILICON OPTICAL DEVICE

(75) Inventor: Thomas R. Keyser, Plymouth, MN (US)

(73) Assignee: Honeywell International, Inc., Morristown, NJ (US)

( * ) Notice: Subject to any disclaimer, the term of this patent is extended or adjusted under 35 U.S.C. 154(b) by 461 days.

(21) Appl. No.: 10/755,212

(22) Filed: Jan. 12, 2004

(65) Prior Publication Data

US 2005/0152658 A1 Jul. 14, 2005

(51) Int. Cl.
*G02B 6/10* (2006.01)
(52) U.S. Cl. .................................. 385/129; 385/131
(58) Field of Classification Search ......... 385/129–132, 385/37, 14, 16, 24, 147; 438/155, 164, 29, 438/24, 149
See application file for complete search history.

(56) References Cited

U.S. PATENT DOCUMENTS

| | | | |
|---|---|---|---|
| 4,234,357 A * | 11/1980 | Scheppele | 438/342 |
| 4,315,693 A | 2/1982 | Walker | 356/350 |
| 4,673,293 A | 6/1987 | Sanders | 356/350 |
| 4,886,345 A | 12/1989 | Popek | 350/355 |
| 4,958,898 A | 9/1990 | Friedman et al. | 350/96.14 |
| 5,029,978 A | 7/1991 | Curtis et al. | 350/96.29 |
| 5,090,810 A | 2/1992 | Malvern | 356/350 |
| 5,143,577 A * | 9/1992 | Haas et al. | 216/24 |
| 5,163,118 A | 11/1992 | Lorenzo et al. | 385/132 |
| 5,383,048 A | 1/1995 | Seaver | 359/279 |
| 5,408,566 A | 4/1995 | Eda et al. | 385/131 |
| 5,429,981 A | 7/1995 | Gardner et al. | 437/60 |
| 5,500,544 A | 3/1996 | Park et al. | 257/296 |
| 5,696,662 A | 12/1997 | Bauhahn | 361/297.1 |
| 5,793,060 A | 8/1998 | Morikawa | 257/85 |
| 5,841,931 A | 11/1998 | Foresi et al. | 385/131 |
| 5,861,651 A | 1/1999 | Brasen et al. | 257/411 |
| 5,908,305 A | 6/1999 | Crampton et al. | 438/141 |
| 6,063,299 A | 5/2000 | Drake et al. | 216/24 |
| 6,108,212 A | 8/2000 | Lach et al. | 361/768 |
| 6,147,362 A | 11/2000 | Keyser | 257/59 |
| 6,150,266 A | 11/2000 | Lin et al. | |
| 6,270,604 B1 | 8/2001 | McCallion et al. | 156/99 |
| 6,311,003 B1 | 10/2001 | Dubey et al. | 385/130 |

(Continued)

FOREIGN PATENT DOCUMENTS

GB 2 355 312 A 4/2001

(Continued)

OTHER PUBLICATIONS

Hilleringmann et al., "Optoelectronic System Integration on Silicon: Waveguides, Photodetectors, and VLSI CMOS Circuits on One Chip", IEEE Transactions on Electron Devices 42 (1995) Mai, No. 5, New York, NY, US, pp. 841-846.

(Continued)

*Primary Examiner*—Kevin S Wood
(74) *Attorney, Agent, or Firm*—McDonnell Boehnen Hulbert & Berghoff LLP

(57) ABSTRACT

An optical device can be fabricated by forming a silicon rib, such as a poly-silicon rib, on a SOI substrate so that a portion of the SOI substrate is exposed, and by forming silicon spacers, such as amorphous or poly-silicon spacers, that round off corners of the silicon rib.

15 Claims, 3 Drawing Sheets

U.S. PATENT DOCUMENTS

| | | | | |
|---|---|---|---|---|
| 6,323,985 | B1 | 11/2001 | Maloney | 359/248 |
| 6,372,609 | B1 | 4/2002 | Aga et al. | 438/459 |
| 6,418,999 | B1 | 7/2002 | Yanagita et al. | 156/584 |
| 6,493,089 | B2 | 12/2002 | Numai | 356/461 |
| 6,493,502 | B1 | 12/2002 | Deliwala | 385/140 |
| 6,526,187 | B1 | 2/2003 | Deliwala | 385/11 |
| 6,546,538 | B1 | 4/2003 | Rubdi et al. | 716/12 |
| 6,566,155 | B1 | 5/2003 | Numai | 438/31 |
| 6,603,166 | B2 | 8/2003 | Fechner et al. | 257/301 |
| 6,603,889 | B2 | 8/2003 | Deliwala | 385/8 |
| 6,608,945 | B2 | 8/2003 | Deliwala | 385/2 |
| 6,611,636 | B2 | 8/2003 | Deliwala | 385/14 |
| 6,625,348 | B2 | 9/2003 | Deliwala | 385/27 |
| 6,627,954 | B1 | 9/2003 | Seefeldt | 257/350 |
| 6,646,747 | B2 | 11/2003 | Deliwala | 356/477 |
| 6,654,511 | B2 | 11/2003 | Deliwala | 385/2 |
| 6,656,747 | B2 | 12/2003 | Sameshima | 438/3 |
| 6,658,173 | B2 | 12/2003 | Delwala | 385/15 |
| 6,671,443 | B2 | 12/2003 | Deliwala | 358/125 |
| 6,690,844 | B2 | 2/2004 | Deliwala | 385/2 |
| 6,690,863 | B2 | 2/2004 | Deliwala | 385/50 |
| 6,693,225 | B2 | 2/2004 | Boyer et al. | 585/265 |
| 6,738,546 | B2 | 5/2004 | Deliwala | 385/50 |
| 6,743,662 | B2 | 6/2004 | Fathimulla et al. | 438/118 |
| 6,748,125 | B2 | 6/2004 | Deliwala | 385/2 |
| 6,760,498 | B2 | 7/2004 | Delwala | 385/14 |
| 6,816,636 | B2 | 11/2004 | Cole et al. | 385/10 |
| 6,819,814 | B2 | 11/2004 | Forrest et al. | 385/14 |
| 6,823,112 | B2 | 11/2004 | Deliwala | 385/37 |
| 6,826,320 | B2 | 11/2004 | Deliwala | 385/14 |
| 6,842,546 | B2 | 1/2005 | Deliwala | 385/14 |
| 6,845,198 | B2 | 1/2005 | Montgomery et al. | 385/50 |
| 6,850,683 | B2 * | 2/2005 | Lee et al. | 385/129 |
| 6,868,214 | B1 | 3/2005 | Sakata et al. | 385/129 |
| 6,869,881 | B2 | 3/2005 | Deliwala | 438/689 |
| 6,879,751 | B2 | 4/2005 | Deliwala | 385/25 |
| 6,888,219 | B2 | 5/2005 | Keyser | 257/532 |
| 6,890,450 | B2 | 5/2005 | Naydenkov et al. | 216/24 |
| 6,891,685 | B2 | 5/2005 | Deliwala et al. | 359/831 |
| 6,891,985 | B2 | 5/2005 | Delwala | 385/14 |
| 6,895,136 | B2 | 5/2005 | Deliwala | 385/14 |
| 6,897,498 | B2 | 5/2005 | Gothoskar et al. | 257/226 |
| 6,898,352 | B2 | 5/2005 | Deliwala | 385/40 |
| 6,912,330 | B2 | 6/2005 | Deliwala | 385/14 |
| 6,917,727 | B2 | 7/2005 | Gunn, III et al. | 385/14 |
| 6,917,730 | B2 | 7/2005 | Ghiron et al. | 385/14 |
| 6,919,238 | B2 | 7/2005 | Bohr | 438/166 |
| 6,934,444 | B2 | 8/2005 | Ghiron et al. | 385/36 |
| 6,944,369 | B2 | 9/2005 | Deliwala | 385/30 |
| 6,947,615 | B2 | 9/2005 | Deliwala | 385/5 |
| 6,963,118 | B2 | 11/2005 | Deliwala et al. | 257/428 |
| 6,968,110 | B2 | 11/2005 | Patel et al. | 385/131 |
| 6,980,720 | B2 | 12/2005 | Gothoskar et al. | 385/43 |
| 6,987,910 | B2 | 1/2006 | Shappir et al. | 385/37 |
| 6,990,257 | B2 * | 1/2006 | Gunn et al. | 385/2 |
| 6,993,225 | B2 | 1/2006 | Patel et al. | 385/43 |
| 6,993,243 | B2 | 1/2006 | Delwala | 385/147 |
| 7,000,207 | B2 | 2/2006 | Gothoskar et al. | 716/8 |
| 7,003,196 | B2 | 2/2006 | Ghiron et al. | 385/36 |
| 7,013,067 | B2 | 3/2006 | Ghiron et al. | 385/39 |
| 7,020,364 | B2 | 3/2006 | Ghiron et al. | 385/36 |
| 7,079,742 | B1 * | 7/2006 | Gunn et al. | 385/129 |
| 7,118,682 | B2 * | 10/2006 | Patel et al. | 216/24 |
| 7,149,388 | B2 | 12/2006 | Keyser et al. | 385/40 |
| 7,177,489 | B2 | 2/2007 | Keyser et al. | 385/1 |
| 7,217,584 | B2 | 5/2007 | Yue et al. | 438/31 |
| 2002/0003650 | A1 | 1/2002 | Usami et al. | 359/248 |
| 2002/0164143 | A1 * | 11/2002 | Csutak et al. | 385/131 |
| 2002/0172464 | A1 | 11/2002 | Delwala | |
| 2002/0185675 | A1 | 12/2002 | Furukawa | 257/327 |
| 2003/0026513 | A1 | 2/2003 | Deliwala | 385/2 |
| 2003/0026571 | A1 * | 2/2003 | Bazylenko | 385/129 |
| 2003/0054639 | A1 | 3/2003 | Deliwala | 438/689 |
| 2003/0059190 | A1 | 3/2003 | Gunn, III et al. | |
| 2003/0063364 | A1 | 4/2003 | Kambe | 359/245 |
| 2003/0081924 | A1 | 5/2003 | Yegnanarayanan et al. | 385/132 |
| 2003/0098289 | A1 | 5/2003 | Zheng et al. | |
| 2003/0102079 | A1 * | 6/2003 | Kalvesten et al. | 156/299 |
| 2003/0151793 | A1 | 8/2003 | Sugiyama et al. | 359/279 |
| 2003/0184950 | A1 | 10/2003 | Nakamura | 361/303 |
| 2003/0207215 | A1 * | 11/2003 | Xu et al. | 430/321 |
| 2003/0223671 | A1 | 12/2003 | Morse | 385/14 |
| 2004/0002197 | A1 | 1/2004 | Fathimulla et al. | 438/455 |
| 2004/0021157 | A1 | 2/2004 | Yue et al. | 257/288 |
| 2004/0041232 | A1 | 3/2004 | Keyser | 257/516 |
| 2004/0126051 | A1 * | 7/2004 | Bruel | 385/14 |
| 2004/0151463 | A1 | 8/2004 | Talin et al. | 385/131 |
| 2004/0190826 | A1 | 9/2004 | Ghiron et al. | 385/36 |
| 2004/0207016 | A1 | 10/2004 | Patel et al. | |
| 2004/0223768 | A1 | 11/2004 | Shastri et al. | 398/183 |
| 2004/0240822 | A1 | 12/2004 | Patel et al. | 385/130 |
| 2004/0258347 | A1 | 12/2004 | Gothoskar et al. | 385/14 |
| 2005/0094938 | A1 | 5/2005 | Ghiron et al. | 385/36 |
| 2005/0094939 | A1 | 5/2005 | Ghiron et al. | 385/36 |
| 2005/0110108 | A1 | 5/2005 | Patel et al. | 257/453 |
| 2005/0123232 | A1 | 6/2005 | Piede et al. | 385/14 |
| 2005/0123259 | A1 * | 6/2005 | Gunn et al. | 385/129 |
| 2005/0135727 | A1 | 6/2005 | Piede et al. | 385/14 |
| 2005/0152658 | A1 | 7/2005 | Keyser | 385/129 |
| 2005/0175286 | A1 | 8/2005 | Patel et al. | 385/43 |
| 2005/0179986 | A1 | 8/2005 | Gothoskar et al. | 359/321 |
| 2005/0189591 | A1 | 9/2005 | Gothoskar et al. | 257/347 |
| 2005/0194990 | A1 | 9/2005 | Gothoskar et al. | 324/765 |
| 2005/0201683 | A1 | 9/2005 | Ghiron et al. | 385/39 |
| 2005/0207691 | A1 | 9/2005 | Keyser et al. | 385/1 |
| 2005/0207704 | A1 | 9/2005 | Keyser et al. | 385/40 |
| 2005/0213873 | A1 | 9/2005 | Piede et al. | 385/14 |
| 2005/0214989 | A1 | 9/2005 | Keyser | 438/155 |
| 2005/0220405 | A1 | 10/2005 | Shappir et al. | 385/37 |
| 2005/0236619 | A1 | 10/2005 | Patel et al. | 257/57 |
| 2005/0289490 | A1 | 12/2005 | Shastri et al. | 716/4 |
| 2006/0018597 | A1 | 1/2006 | Piede et al. | 385/39 |
| 2006/0038144 | A1 | 2/2006 | Maddison | 250/559.05 |
| 2006/0063679 | A1 | 3/2006 | Yue et al. | 505/190 |
| 2006/0083144 | A1 | 4/2006 | Piede et al. | 369/100 |
| 2007/0000862 | A1 | 1/2007 | Patel et al. | 216/24 |
| 2007/0101927 | A1 | 5/2007 | Keyser et al. | 117/20 |
| 2007/0109549 | A1 | 5/2007 | Sanders et al. | 356/469 |
| 2007/0133003 | A1 | 6/2007 | Sanders et al. | 356/461 |

FOREIGN PATENT DOCUMENTS

| | | |
|---|---|---|
| JP | 404154178 A | 5/1992 |
| JP | 06029314 | 4/1994 |
| WO | WO 02/069026 A2 | 9/2002 |
| WO | WO 03/023468 A1 | 3/2003 |
| WO | WO 03/077015 A1 | 9/2003 |
| WO | WO 2004/088394 A2 | 10/2004 |
| WO | WO 2004/088396 A2 | 10/2004 |
| WO | WO 2004/095112 A2 | 11/2004 |

OTHER PUBLICATIONS

Liu et al., "Fast silicon optical modulator", Proc. Of the SPIE—Optoelectronic Integration on Silicon—Jul. 2004, vol. 5357, pp. 35-44.

Liu et al., "A high-speed silicon optical modulator based on a metal-oxide-semiconductor capacitor", Feb. 12, 2004, Nature Publishing Group, vol. 427, pp. 615-618.

Liu et al., "A High-Speed Silicon Optical Modulator Based on a Metal-Oxide-Semiconductor Capacity," Nature, vol. 427, Feb. 12, 2004. www.nature.com.

Liu et al., "A High-Speed Silicon Optical Modulator Based on a Metal-Oxide-Semiconductor Capacity," Nature, vol. 427, Feb. 12, 2004. www.nature.com.

U.S. Appl. No. 60/458,501, filed Mar. 28, 2003, Patel et al.
U.S. Appl. No. 60/457,242, filed Mar. 25, 2003, Montgomery et al.
U.S. Appl. No. 60/464,491, filed Apr. 21, 2003, Patel et al.
U.S. Appl. No. 60/863,778, filed Oct. 31, 2006, Keyser et al.
U.S. Appl. No. 60/863,766, filed Oct. 31, 2006, Keyser et al.
U.S. Appl. No. 60/831,181, filed Jul. 14, 2006, Keyser.
U.S. Appl. No. 60/611,210, filed Sep. 17, 2004, Keyser et al.
U.S. Appl. No. 11/342,158, filed on Jan. 27, 2006.
U.S. Appl. No. 11/406,939, filed on Apr. 18, 2006.
U.S. Appl. No. 11/412,738, filed on Apr. 26, 2006.
U.S. Appl. No. 11/224,808, filed on Sep. 13, 2005.
U.S. Appl. No. 11/557,185, filed on Nov. 7, 2006.
U.S. Appl. No. 11/306,952, filed on Jan. 16, 2007.
U.S. Appl. No. 11/433,965, filed on May 15, 2007.
Ahmed et al., "Nitrided Thermal SiO2 for Thin Buried Gate Insulator in Dual Gate SOI-MOSFET", University/Government Industry Microelectronics Symposium, 1999 Proceedings of the Thirteenth Biennial Minneapolis, MN Jun. 20-23, 1999, Piscatatway, NJ, IEEE, Jun. 20, 1999, pp. 43-46.
Ahmed et al., "Nitrided Thermal SiO2 for Use as Top and Bottom Gate Insulators in Self-Aligned Double Gate Silicon-on-Insulator Metal-Oxide-Semiconductor Field Effect Transistor", Journal of Vacuum Science & Technology B (Microelectronics and Nanometer Structures) AIP for American Vacuum Soc., vol. 19, No. 3, May 2001, pp. 800-806.
Celler et al., "Smart Cut TM. A guide to the Technology, the Process, the Products", SOITEC, Jul. 2003, 1-8.
Celler et al., "Strained Silicon on Insulator. A quick Guide to the Technology, the Processes, the Products", SOITEC, Jul. 2003, 1-4.

Joshi et al., "Oxynitride Gate Dielectrics for p+ Polysilicon Gate MOS Devices", IEEE Electron Devices Letters, vol. 14, No. 12, Dec. 1993, pp. 560-562, XP000418671.
Ling Liao et al., "Optical Transmission Losses in Plycrystalline Silicon Strip Waveguides: Effects on Waveguide Dimensions, Thermal Treatment Hydrogen Passivation, and Wavelength", Journal of Electronic Materials, vol. 29, No. 12, 2002, 1380.
Nishihara, Hiroshi, et al., "Optical Integrated Circuits", R.R. Donnelley & Sons Company, 1989, pp. 224-235.
PNG et al., "Development of Small Silicon Modulators in Silicon-on Insulator (SOI)", Proceedings of the SPI, SPIE, Bellingham, VA, vol. 4997, 2003, pp. 190-197.
Reed, G.T., et al., "Silicon on Insulator Optical Waveguides Formed by Direct Wafer Bonding", Materials Science and Engineering B, Elsevier Sequoia, Lausame, Ch. vol. B15, No. 2, Nov. 1, 1992, pp. 156-159.
Samara-Rubio D. et al., "A Gigahertz Silicon-on-Insulator Mach-Zehnder Modulator", Optical Fiber Communication Conference, 2004. OFC 2004 Los Angeles, CA USA, Feb. 23-25, 2004, IEEE, Feb. 26, 2004, pp. 701-703, XP10745963.
Singh Jagar et al., "Design Methodology of the High Performance Large-Grain Polysilicon MOSFET", IEEE Transactions on Electron Devices, vol. 49, No. 5, May 2002, 795-801.
Waldron et al., "Optical Modulator in Silicon-on-Insulator with a Low Thermal Signature", J. Vac. Sci. Thechnol. A 22(3) May/Jun. 2004, 2004 American Vacuum Society.

* cited by examiner

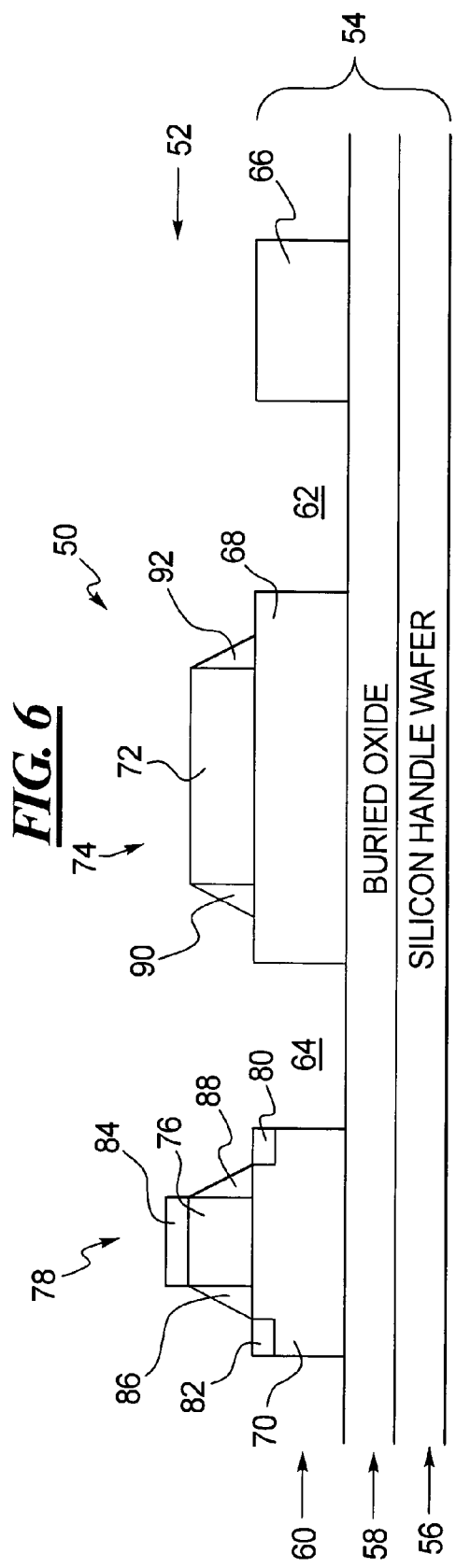
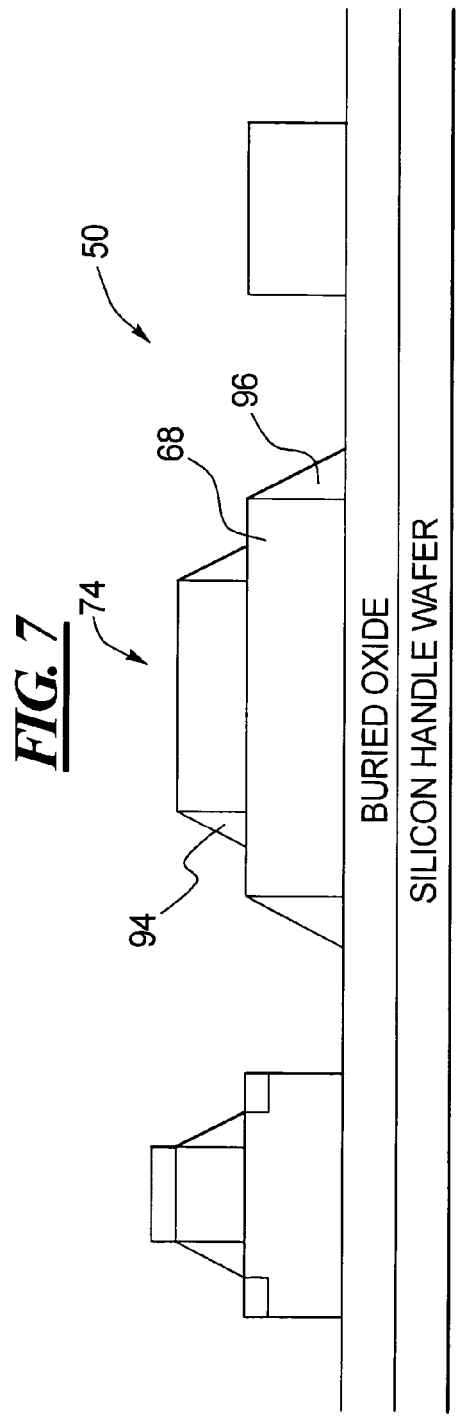

SILICON OPTICAL DEVICE

TECHNICAL FIELD OF THE INVENTION

The present invention relates to optical devices such as optical waveguides.

BACKGROUND OF THE INVENTION

Optical devices such as optical waveguides can be fabricated in Silicon-on-Insulator (SOI) films in configurations that are compatible with integrated circuit structures. One promising implementation, which has been described elsewhere, involves the use of a single crystal SOI film and the formation of a thin poly-silicon upper layer deposited on the SOI film. In this implementation, the thin poly-silicon upper layer is patterned to form the light guiding element or patterned with the SOI film to form SOI/poly composite light guiding features. Poly-silicon alone can also guide light. However, the additional crystalline silicon is desirable to minimize optical losses.

Unfortunately, modern silicon etch systems and processes are optimized so as to prepare vertical features that closely match the dimensions of the masking film. Such vertical features are efficient and necessary for fabricating poly-silicon gates for advanced microelectronics, but the sharp edges of the vertical features can degrade performance in optical device structures such as optical waveguides. Also, patterning using these silicon etch systems and processes can contribute to irregular edges, especially when applied to polycrystalline films.

An optical device according to one embodiment of the present invention has an upper silicon or poly-silicon feature with rounded corners. Rounding the corners of the upper silicon poly-silicon feature improves the performance of optical devices such as optical waveguides.

SUMMARY OF THE INVENTION

In accordance with one aspect of the present invention, a method of making an optical device comprises the following: forming a silicon island of the optical device such that the silicon island has side walls; and, forming silicon spacers along the side walls in order to round off corners of the silicon island.

In accordance with another aspect of the present invention, a method of making an optical device comprises the following: forming a silicon island of the optical device, wherein the silicon island comprises vertical walls; and, forming amorphous silicon spacers along the vertical walls of the silicon island so as to round off the corners of the silicon island.

In accordance with still another aspect of the present invention, a method of making an opto-electronic integrated circuit comprises the following: forming a silicon rib on a SOI substrate so that a portion of the SOI substrate is exposed and so that the silicon rib has side walls; implanting a well in the SOI substrate; forming an oxide layer over the silicon rib, the exposed SOI substrate, and the implanted well; forming a silicon layer over the oxide layer; and, anisotropically etching the silicon layer so as to leave a gate over the well and silicon spacers along the side walls of the silicon rib so as to round off corners of the silicon rib.

In accordance with yet another aspect of the present invention, an optical device comprises a SOI structure, a poly-silicon feature on the SOI structure, and silicon spacers. The poly-silicon feature has a top surface, vertical side walls, and corners joining the top surface and the vertical side walls. The silicon spacers are provided along the vertical side walls to round off the corners of the poly-silicon feature.

In accordance with a further aspect of the present invention, an opto-electronic device comprises a SOI structure, an optical device formed on the SOI structure, an electronic device, and silicon spacers. The optical device comprises a surface and vertical side walls and corners joining the surface and the vertical side walls. The electronic device is formed on the SOI structure. The silicon spacers are provided along the vertical side walls to round off the corners of the optical device.

BRIEF DESCRIPTION OF THE DRAWINGS

These and other features and advantages of the present invention will become more apparent from a detailed consideration of the invention when taken in conjunction with the drawings in which:

FIG. 6 illustrates a first embodiment of an opto-electronic device having spacers according to the present invention; and, FIG. 7 illustrates a second embodiment of an opto-electronic device having spacers according to the present invention.

DETAILED DESCRIPTION

Figure 1:
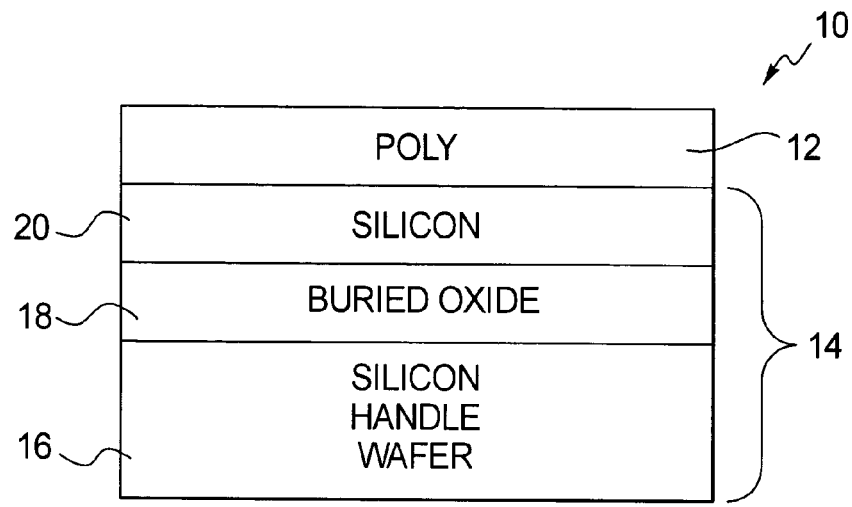
FIG. 1 illustrates a SOI structure having a poly-silicon layer formed thereon.

As shown in FIG. 1, a composite optical device 10 is fabricated by first depositing a poly-silicon layer 12 on a SOI structure 14. If desired, a thin dielectric may be provided between the poly-silicon layer 12 and SOI structure 14 to help confine dopants and to facilitate poly patterning. This dielectric may be a gate oxide and may have a thickness of 30-100 Å. The poly-silicon layer 12 is preferably, although not necessarily, as crystalline as possible to minimize losses and is indexed-matched to the SOI structure 14 to allow uniform expansion of a light beam into the poly-silicon layer 12 from the SOI structure 14.

As is typical, the SOI structure 14 includes a silicon handle wafer 16, a buried oxide layer 18 formed over the silicon handle wafer 16, and a silicon layer 20 formed over the buried oxide layer 18. The silicon layer 20, for example, may be formed from single crystal silicon. Also, the thickness of the poly-silicon layer 12, for example, may be on the order of 1200-1600 Å. Similarly, the thickness of the SOI structure 14, for example, may be on the order of 1200-1600 Å.

Figure 2:
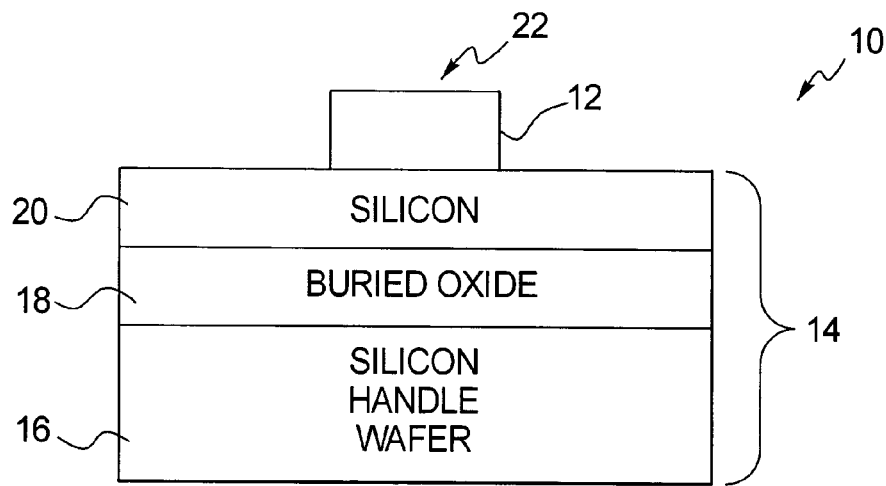
FIG. 2 illustrates the poly-silicon layer of FIG. 1 after patterning.

As shown in FIG. 2, the poly-silicon layer 12 is patterned to form the appropriate features, such as a poly-silicon rib 22, of a desired optical device. In terms of an optical waveguide, the poly-silicon layer 12 is patterned to form, or to contribute to the formation of, a light guiding rib of the optical waveguide. The poly-silicon rib 22 may be formed, for example, by placing an appropriate mask over the poly-silicon layer 12, and by applying an etchant to remove the unwanted poly-silicon. The poly-silicon layer 12 may be etched selectively with respect to the underlying (oxidized) SOI structure 14. A dry etchant, such as a plasma, may be used for this purpose to maximize control.

Figure 3:
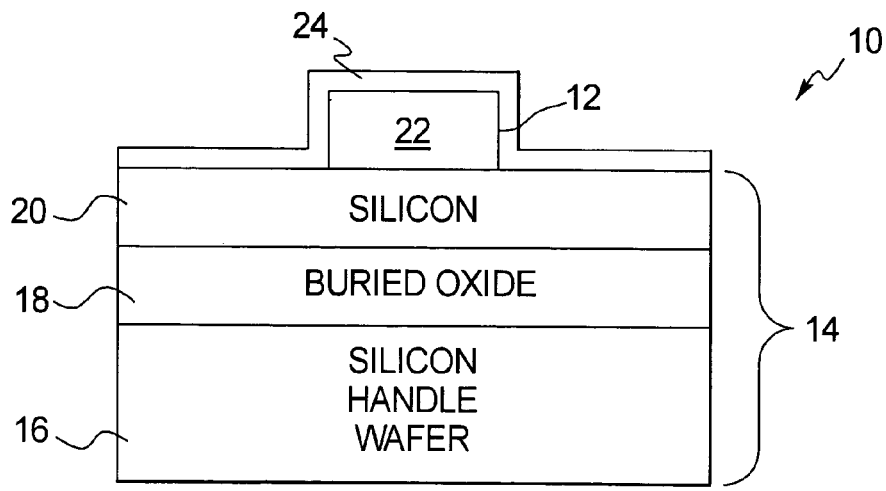
FIG. 3 illustrates an oxide layer formed over the exposed silicon layer and the patterned poly-silicon layer shown in FIG. 2.

As shown in FIG. 3, an oxide layer 24 is formed over the exposed silicon layer 20 and the poly-silicon rib 22. The oxide layer 24 may have a thickness, for example, of approximately 30 to 100 Å. The oxide layer 24 is used as an etch stop during the subsequent etching described below. The oxide layer 24 can also provide gate oxide for other devices formed on the SOI structure 14. The oxide layer 24, however, may be omitted if desired. Other dielectric materials such as silicon nitride could be used in place of the oxide in the oxide layer 24.

Figure 4:
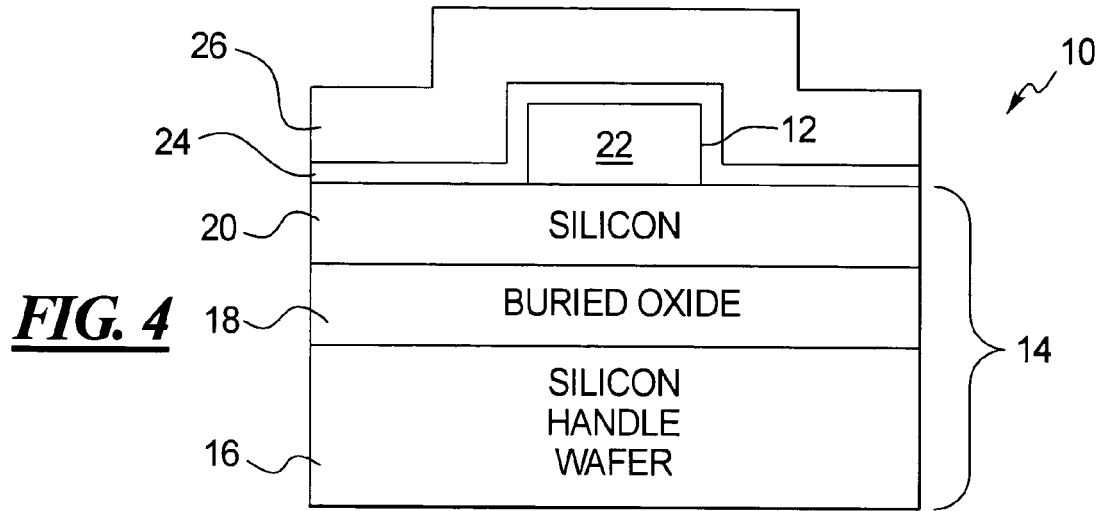
FIG. 4 illustrates a second conformal amorphous or poly silicon layer deposited over the oxide layer of FIG. 3.
Figure 5:
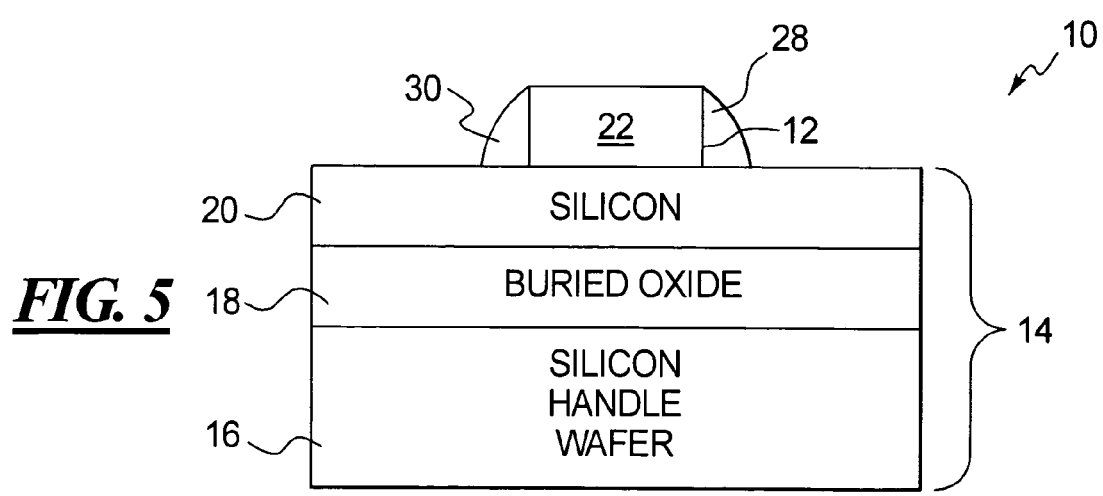
FIG. 5 illustrates the poly-silicon spacers that remain after etching.

As shown in FIG. 4, a conformal amorphous or poly-silicon layer 26 is deposited over the oxide layer 24. The thickness of the conformal amorphous or poly-silicon layer 26, for example, may be on the order of 2000 to 3000 Å. As shown in FIG. 5, the conformal amorphous or poly-silicon layer 26 is anisotropically etched until the material is removed from all horizontal surfaces, leaving amorphous or poly-silicon spacers 28 and 30 along the side walls of the original poly-silicon rib 22. These amorphous or poly-silicon spacers 28 and 30 round the corners of the poly-silicon rib 22, thus reducing the optical losses and improving the performance of the optical device 10.

The process described above does not rely on complex isotropic/anisotropic etching, oxidation, potentially damaging chemical mechanical planarization (CMP), or physical sputtering processes that are available in a typical fabrication facility. The process described above instead utilizes simple poly or amorphous silicon deposition and anisotropic etching processes to create a composite silicon structure with the necessary rounded edges.

Producing an optical waveguide or other optical device with rounded corners and with acceptable control and repeatability in a device compatible process flow is not easily accomplished by modern fabrication tools. Silicon etchers are designed and conditioned to etch vertical wall features. Older resist erosion techniques utilize oxygen containing chemistries that are not compatible with poly-silicon to oxide selectivity requirements. Wet-dry etching processes require special masks and protection for the silicon regions, and suffer from poor control and edge uniformity. Oxidation processes do not produce the desired rounding. CMP techniques are subject to pattern density variations.

The spacers and the process of forming these spacers as described herein, however, produces the desired rounded corners and/or reduces or eliminates the problems of the other processes described herein.

The spacers can be implemented along portions of the SOI or SOI/poly wave guide to reduce edge non-uniformities and round corners to minimize losses. Spacers are also useful for facilitating light transmission from a SOI waveguide to a composite SOI/poly-silicon waveguide.

Certain modifications of the present invention have been discussed above. Other modifications will occur to those practicing in the art of the present invention. For example, the process described herein is very compatible with the formation of integrated opto-electronic devices. If desired, the poly-silicon layer 12 can be deposited and patterned to form the poly-silicon rib 22 and can also be deposited and patterned over a suitable well region or regions. If desired, the well region or regions can be suitably implanted, and an oxide layer (such as the oxide layer 24) can be grown to also form a gate oxide. The conformal amorphous or poly-silicon layer 26 can be deposited, masked, and etched to form not only the amorphous or poly-silicon spacers 28 and 30, but also one or more gates of electronic devices.

Moreover, because the process disclosed herein can utilize planar isolation such as shallow trench isolation, the amorphous or poly-silicon spacers 28 and 30 can be left around the poly-silicon rib 22 without compromising the fidelity of the gate pattern. The process sequence can then continue along the conventional flow.

An opto-electronic device 50 using shallow trench isolation and having poly-silicon spacers at appropriate edges is shown in FIG. 6. The opto-electronic device 50 is fabricated by first depositing a poly-silicon layer 52 on a SOI structure 54. If desired, a thin dielectric may be provided between the poly-silicon layer 52 and SOI structure 54 to help confine dopants and to facilitate poly patterning. The SOI structure 54 includes a silicon handle wafer 56, a buried oxide layer 58 formed over the silicon handle wafer 56, and a silicon layer 60 formed over the buried oxide layer 58. The silicon layer 60, for example, may be formed from single crystal silicon. Shallow trenches 62 and 64 are formed in the silicon layer 20 resulting in silicon islands 66, 68, and 70. The poly-silicon layer 52 is patterned to form a poly-silicon rib 72 of an optical device 74 and a poly-silicon gate 76 of an electronic device 78. The poly-silicon rib 72 is thus formed on the silicon island 68, and the poly-silicon gate 76 is formed on the silicon island 70. Moreover, the poly-silicon rib 72 and the poly-silicon gate 76 may themselves be referred to as silicon islands, albeit poly-silicon islands. The electronic device 78 may also include silicide regions 80, 82, and 84 and oxide spacers 86 and 88. Finally, the optical device 74 includes poly-silicon spacers 90 and 92 as described above. Moreover, because the requirements of the optical device 74 and of the electronic device 78 may differ, it can be difficult to create the optical devices and gates of electronic devices in the same poly-silicon layer. If so, a second poly-silicon (spacer) layer can be used to construct the gates.

As shown in FIG. 7, the vertical edges of the silicon island 68 of the optical device 74 may also be provided with poly-silicon spacers 94 and 96. The silicon island 68, for example, can be used to also guide light.

The present invention can be used in connection with optical devices other than optical waveguides. For example, the present invention can also be used in connection with optical modulators, optical switches, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:
1. A method of making an optical device comprising:
   forming a silicon island on an SOI structure of the optical device such that the silicon island has side walls, wherein the forming of a silicon island comprises forming a silicon rib on a SOI substrate so that a portion of the SOI substrate is exposed and so that the silicon rib has side walls, and
   forming silicon spacers along the side walls in order to round off corners of the silicon island, wherein the silicon spacers comprise poly-silicon or amorphous silicon, and wherein the forming of silicon spacers comprises:
      forming a silicon layer over the silicon rib and the exposed SOI substrate; and
      removing the silicon layer so as to provide silicon spacers along the side walls in order to round off corners of the silicon rib.

2. The method of claim 1 wherein the removing of the silicon layer comprises anisotropically etching the silicon layer so as to leave the silicon spacers along the side walls in order to round off the corners of the silicon rib.

3. The method of claim 2 wherein the forming of a silicon rib on a SOI substrate comprises:
forming a poly-silicon layer over the SOI substrate;
masking the poly-silicon layer; and
etching the poly-silicon layer to form a poly-silicon rib.

4. The method of claim 2 wherein the forming of a silicon layer over the silicon rib and the exposed SOI substrate comprises:
forming a conformal oxide layer over the rib and the exposed SOI substrate; and
forming a conformal poly-silicon layer over the oxide layer.

5. The method of claim 4 wherein the forming of a silicon rib on a SOI substrate comprises:
forming a poly-silicon layer over the SOI substrate;
masking the poly-silicon layer; and
etching the poly-silicon layer to form a poly-silicon rib.

6. The method of claim 1 wherein the forming of a silicon rib on a SOI substrate comprises forming a poly-silicon rib on a SOI substrate so that a portion of the SOI substrate is exposed and so that the poly-silicon rib has side walls.

7. The method of claim 6 wherein the removing of the silicon layer comprises anisotropically etching the silicon layer so as to leave the silicon spacers along the side walls in order to round off the corners of the poly-silicon rib.

8. The method of claim 1 wherein the optical device comprises an optical waveguide.

9. The method of claim 1 wherein the SOI substrate comprises a silicon handle wafer, a buried oxide layer over the silicon handle wafer, and a single crystal silicon layer over the buried oxide layer.

10. The method of claim 9 wherein the forming of a silicon rib on a SOI substrate comprises forming a poly-silicon rib on the single crystal silicon so that a portion of the single crystal silicon is exposed and so that the poly-silicon rib has side walls.

11. The method of claim 10 wherein the removing of the silicon layer comprises anisotropically etching the silicon layer so as to leave the silicon spacers along the side walls in order to round off the corners of the poly-silicon rib.

12. The method according to claim 1,
wherein the silicon island is a silicon rib;
wherein the method further comprises, after forming the silicon island and before forming the silicon spacers,
implanting a well in the SOI substrate; and
forming an oxide layer over the silicon rib, the exposed SOI substrate, and the implanted well; and
wherein the forming a silicon layer over the silicon rib and the exposed SOI substrate comprises forming a silicon layer over the oxide layer; and
wherein the removing the silicon layer comprises anisotropically etching the silicon layer so as to leave a gate over the well and silicon spacers along the side walls of the silicon rib so as to round off corners of the silicon rib.

13. The method of claim 12 wherein the silicon rib comprises a poly-silicon rib.

14. The method of claim 12 wherein the silicon spacers comprise poly-silicon spacers.

15. The method of claim 12 wherein the silicon spacers comprise amorphous silicon spacers.

\* \* \* \* \*